US008462456B2

(12) United States Patent
Honda

(10) Patent No.: US 8,462,456 B2
(45) Date of Patent: Jun. 11, 2013

(54) MAGNETIC DATA ERASER

(76) Inventor: Tadashi Honda, Kawasaki (JP)

( * ) Notice: Subject to any disclaimer, the term of this patent is extended or adjusted under 35 U.S.C. 154(b) by 0 days.

(21) Appl. No.: 13/605,342

(22) Filed: Sep. 6, 2012

(65) Prior Publication Data

US 2012/0327530 A1    Dec. 27, 2012

Related U.S. Application Data

(62) Division of application No. 12/879,037, filed on Sep. 10, 2010.

(30) Foreign Application Priority Data

May 12, 2010  (JP) ................................. 2010-109909

(51) Int. Cl.
*G11B 5/03* (2006.01)
*H01F 13/00* (2006.01)
*H01H 47/00* (2006.01)

(52) U.S. Cl.
USPC .............................. 360/66; 361/149; 361/267

(58) Field of Classification Search
None
See application file for complete search history.

(56) References Cited

U.S. PATENT DOCUMENTS

2007/0047128 A1* 3/2007 Kadowaki et al. .............. 360/66
2008/0007859 A1* 1/2008 Komori ........................... 360/66

* cited by examiner

*Primary Examiner* — Regina N Holder
(74) *Attorney, Agent, or Firm* — Lowe Hauptman Ham & Berner, LLP

(57) ABSTRACT

The present invention relates providing a magnetic data eraser that is capable of performing magnetizing process for magnetizing magnetic recording medium such as a hard disk drive (HDD) is easily and with reduced electric power.

The magnetic data eraser includes: holding drawer means for holding a magnetic recording medium which means has a mounting tray for mounting the magnetic recording medium, wherein the mounting tray is inclined a predetermined value of degrees of angle; and magnetizing means for magnetizing the magnetic recording medium, wherein the magnetizing means is covered by a magnetizing coil and has a hollow body portion, the holding drawer means being accommodated in the hollow body portion, and the magnetic recording medium being placed on the mounting tray of the holding drawer means.

1 Claim, 7 Drawing Sheets

MAGNETIC DATA ERASER

CROSS REFERENCE TO RELATED APPLICATION

The present application is based on and claims priority from Japanese Patent Application Number 2010-109909, filed May 12, 2010, the disclosure of which is hereby incorporated by reference herein its entirety.

BACKGROUND OF THE INVENTION

1. The Field of the Invention

The present invention relates to a magnetic data eraser that is configured to erase magnetic data stored in a magnetic recording medium such as a hard disk drive.

2. Description of the Prior Arts

Nowadays, when a magnetic disk drive (hereinafter, it is exemplified by a hard disk drive) is intended to be discarded after it has been finished to be used in an office of a company or by an individual person, magnetic data should be erased by formatting the hard disk drive, for example, upon a request from an operating system in a computer while the hard disk drive is connected to the computer, in order to conceal the magnetic data stored in the hard disk drive from a third person, i.e., an unrelated person.

However, in the above mentioned method, only a management region of the hard disk which manages arrangement of magnetic information on the hard disk and the like may be erased, and actual magnetic information is remained on the hard disk. Thus, for example, a method for erasing information stored in the magnetic disk drive has been accepted to be carried out with applying magnetic force generated by an electromagnet on the magnetic disk drive.

Japanese Laid-Open Patent Application 2007-66439 discloses an invention relating to a data eraser that performs data erasing process with a simple operation to prevent the magnetic data stored in the magnetic recording medium to be discarded from leaking, in particular discloses an invention relating to a data eraser that performs data erasing process by applying horizontal magnetic field from a magnet on the magnetic recording medium.

However, recently a perpendicular magnetic recording method becomes to be adopted, and in the perpendicular magnetic recording, magnetic field being in a perpendicular direction is applied to the magnetic disk drive to store data in the magnetic recording medium. This perpendicular magnetic recording method may be more effective in comparison with an in-plane magnetic recording method (or horizontal magnetic recording method) which is one of the conventional recording methods including one disclosed in Japanese Laid-Open Patent Application 2007-66439, because the perpendicular magnetic recording method can provide an improved recording density of data in comparison with the in-plane magnetic recording method. Hence, when data stored in the magnetic disk drive is intended to be erased, because the magnetic disk drive may utilize either the in-plane magnetic recording method or the perpendicular magnetic recording method and it cannot be determined which method is utilized only by looking its appearance, it has been needed to operate a data eraser to apply magnetic field being in the horizontal direction to the magnetic disk drive or to apply extremely strong magnetic field, and then further to apply magnetic field being in the perpendicular direction to the magnetic disk drive.

Therefore, there has been needed to take a longer time and complex operations to perform data erasing process for erasing date stored in a magnetic recording medium by using a conventional data eraser. Further, a large electric power has been needed to supply to an electromagnet to generate magnetic field to be used for applying to the magnetic recording medium.

SUMMARY OF THE INVENTION

The present invention has been made taking the above mentioned problems into consideration, and an object of the present invention is to provide a magnetic data eraser (or a magnetizing apparatus or a degaussing apparatus) that is capable of performing data erasing process for erasing data stored in a magnetic recording medium such as a hard disk drive (HDD) with ease and performing magnetic data erasing process with consuming reduced electric power.

According to a first aspect of the invention, the above mentioned problems are solved by providing a magnetic data eraser (or a magnetizing apparatus or a degaussing apparatus) that includes: holding drawer means for holding a magnetic recording medium which means has a mounting tray for mounting the magnetic recording medium, wherein the mounting tray is inclined a predetermined value of degrees of angle; and magnetizing means for magnetizing the magnetic recording medium, wherein the magnetizing means is configured to be covered by a magnetizing coil and has a hollow body portion, the holding drawer means being mounted in the hollow body portion, and the magnetic recording medium being placed on the mounting tray of the holding drawer means.

Further, according to a second aspect of the invention, the above mentioned problems are solved by providing the magnetic data eraser (or a magnetizing apparatus or a degaussing apparatus) in which the magnetic recording medium is a hard disk drive.

Further, according to a third aspect of the invention, the above mentioned problems are solved by providing the magnetic data eraser (or a magnetizing apparatus or a degaussing apparatus) in which the predetermined value of degrees of angle of which the mounting tray is inclined is between 10 and 70 degrees.

Further, according to a fourth aspect of the invention, the above mentioned problems are solved by providing the magnetic data eraser (or a magnetizing apparatus or a degaussing apparatus) further includes a measuring coil that is linked to the magnetizing coil and measures magnetic flux density excited by the magnetizing coil.

Further, according to a fifth aspect of the invention, the above mentioned problems are solved by providing the magnetic data eraser (or a magnetizing apparatus or a degaussing apparatus) in which information measured by the measuring coil is supplied to an external computer.

Further, according to a sixth aspect of the invention, the above mentioned problems are solved by providing the magnetic data eraser (or a magnetizing apparatus or a degaussing apparatus) further includes light emitting means for emitting light using electric current flowing through the measuring coil.

Further, according to a seventh aspect of the invention, the above mentioned problems are solved by providing a magnetic data eraser (or a magnetizing apparatus or a degaussing apparatus) in which the light emitting means is a light emitting diode.

Further, according to a eighth aspect of the invention, the above mentioned problems are solved by providing a magnetic data eraser (or a magnetizing apparatus or a degaussing apparatus) which includes: a hard disk drive fixing tray that has a mounting tray for a magnetic recording medium, the mounting tray being inclined a predetermined value of degrees angle; and magnetizing means that is configured to be covered by a magnetizing coil and has a hollow body portion, the holding drawer means being mounted in the hollow body portion, and the magnetic recording medium being placed on the mounting tray of the holding drawer means.

Further, according to a ninth aspect of the invention, the above mentioned problems are solved by providing a magnetic data eraser (or a magnetizing apparatus or a degaussing apparatus) in which the mounting tray of the hard disk drive fixing tray has holding means for holding a front-end portion of the magnetic recording medium of a predetermined length in a manner such that the hard drive is immobilized to keep its position and angle.

Further, according to a tenth aspect of the invention, the above mentioned problems are solved by providing a magnetic data eraser (or a magnetizing apparatus or a degaussing apparatus) that includes: holding drawer means for holding a magnetic recording medium which means has a mounting tray for mounting the magnetic recording medium, the mounting tray being inclined a predetermined value of degrees of angle; magnetizing means for magnetizing the magnetic recording medium, the magnetizing means being configured to be covered by a magnetizing coil and has a hollow body portion, the holding drawer means being mounted in the hollow body portion, and the magnetic recording medium being placed on the mounting tray of the holding drawer means; capturing means for capturing an image of the magnetic recording medium, which is provided in the holding drawer means; and storage means for storing an image that is captured by the capturing means.

Further, according to an eleventh aspect of the invention, the above mentioned problems are solved by providing a magnetic data eraser (or a magnetizing apparatus or a degaussing apparatus) in which information about the image stored in the storage means is sent for user of the magnetic data eraser together with the magnetic recording medium.

ADVANTAGES OF THE INVENTION

According to the present invention, a magnetic data eraser (or a magnetizing apparatus or a degaussing apparatus) is provided, which eraser is capable of performing data erasing process in which data of magnetic recording medium such as a hard disk drive (HDD) is erased easily and capable of performing the magnetic data erasing process with reduced electric power.

BRIEF DESCRIPTION OF THE DRAWINGS

The present invention will be understood more fully from the detailed description to be given herein below and from the accompanying drawings of the preferred embodiment of the invention, which is not taken to limit the invention to the specific embodiments but should be recognized for the purpose of explanation and understanding only.

In the drawings:

FIGS. 1a-1d are structure diagrams of a magnetizing apparatus for magnetizing a magnetic recording medium according to a first embodiment, wherein FIG. 1a is a front view of the magnetizing apparatus, FIG. 1b is a side view of the magnetizing apparatus, FIG. 1c is a back view of the magnetizing apparatus, and FIG. 1d is a top view of the magnetizing apparatus;

FIGS. 2a-2e are structure diagrams of a holding drawer mounted in the magnetizing apparatus for the magnetic recording medium according to the first embodiment, wherein FIG. 2a is a front view of the holding drawer, FIG. 2b is a side view of the holding drawer, FIG. 2c is a back view of the holding drawer, FIG. 2d is a top view of the holding drawer, and FIG. 2e is a diagram showing a state in which a hard disk drive is mounted on the holding drawer;

DETAILED DESCRIPTION OF PREFERRED EMBODIMENTS

Figure 1:
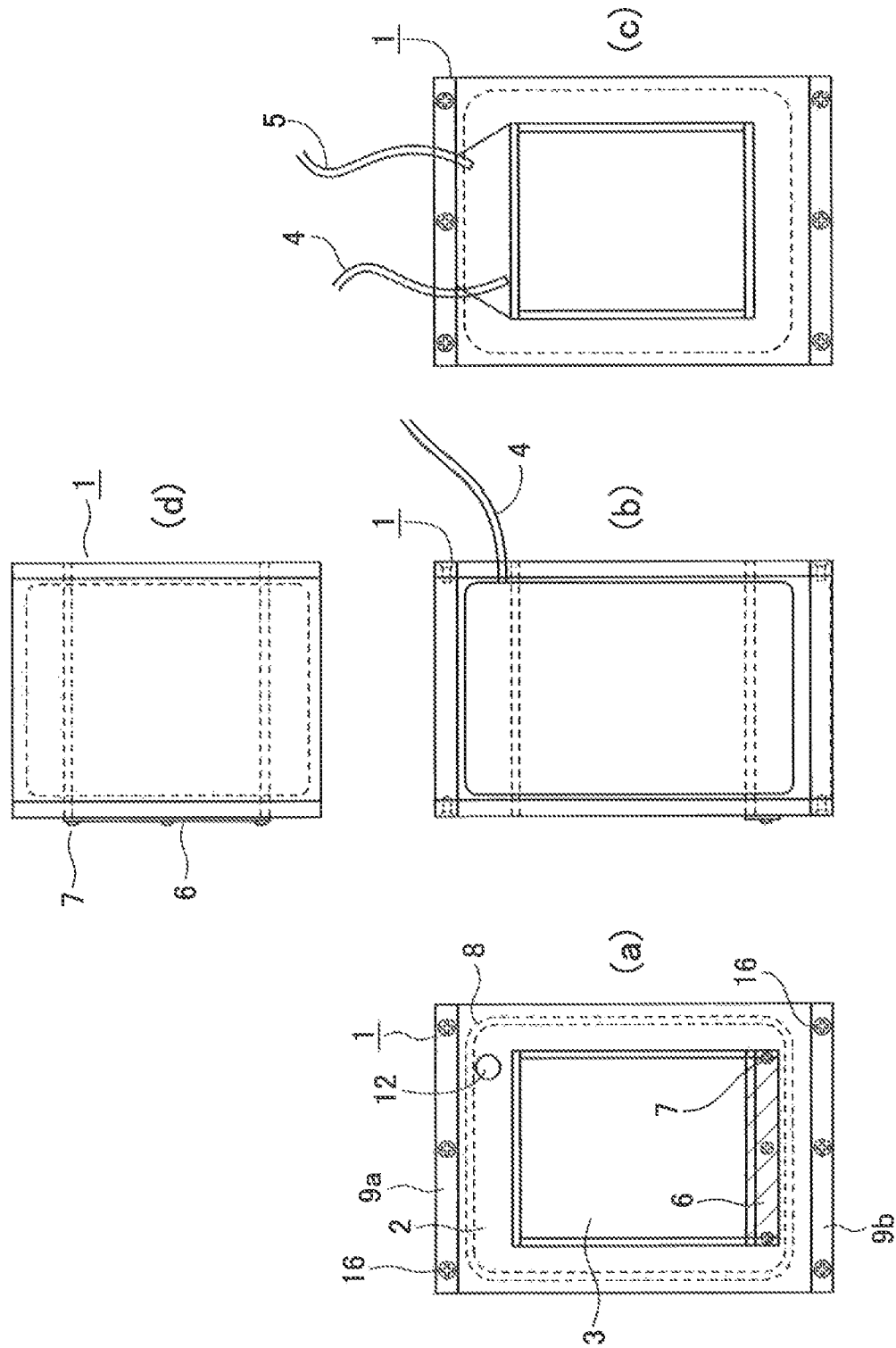

Some preferred embodiments of the present invention will be explained below with reference to attached drawings. Identical constituents are denoted by the same reference numerals throughout the drawings.

(First Embodiment)

FIGS. 1a-1d are diagrams for explaining structure of a magnetizing apparatus (a magnetic data eraser) for magnetizing a magnetic recording medium according to a first embodiment of the present invention. FIG. 1a is a front view of the magnetizing apparatus, FIG. 1b is a side view of the magnetizing apparatus, FIG. 1c is a back view of the magnetizing apparatus, and FIG. 1d is a top view of the magnetizing apparatus.

In FIGS. 1a-1d, the magnetizing apparatus 1 that also may serve as a magnetic data eraser for erasing date stored in the magnetic recording medium is configured to have a magnetizing coil (forming portion) 2 and a hollow body portion 3 to which a holding drawer (or a holding drawer means) for holding a magnetic recording medium is accommodated or mounted, although the holding drawer will be discussed below in more detail. The magnetizing coil 2 is made from a number of turns of winding, and ends of the winding (wire) are connected to an electric current supply (not shown) via leads 4, 5. For example, although a flat wire or a square wire can be used as the winding, a usual copper wire can be used as the winding. It should be noted that the holding drawer may serve as holding drawer means and hollow body portion 3 may serve as magnetizing means.

The hollow body portion 3 is configured to have a volume which can accommodate or hold the holding drawer, and the volume has dimensions, for example, having 110 mm in width, 133 mm in height, and 157 mm in depth. In the hollow body portion 3, magnetic field may be generated by the magnetizing coil, and magnetic flux may be formed, for example, in a direction from the front side of the plane of the paper to the rear side, or in a direction from the rear side of the plane of the paper to the front side. Further, magnetic flux density may be determined by a electric current supplied to the magnetizing coil.

Further, a stopper 6 is attached to a front surface of the magnetizing apparatus 1 shown in FIG. 1a via a screw 7 so as to prevent the holding drawer to be discussed below from being ejected to outer space of the magnetizing apparatus 1 by the magnetic flux, in particular to prevent the holding drawer being escaped beyond the front side of the magnetizing apparatus 1.

Further, 2-3 turns of a measurement winding (or a measuring coil) 8, the measurement winding (or a measuring coil) being able to be used to detect magnetic field, may be wounded to cover the magnetizing coil forming portion 2 mentioned above. This measurement winding 8 may be a coil for detecting the magnetic flux density generated by the magnetizing coil forming portion 2, and detected data may be send to a (not shown) personal computer (PC) via leads 10, 11.

A light emitting diode (LED) 12, which may be served as light emitting means, can be activated to emit light by electric current passing through the measurement winding 8. This LED 12 may be mounted on an upper portion of the front surface of the magnetizing apparatus 1, as shown in FIG. 1*a*, to indicate a evidence that magnetizing process is in progress for a user of the magnetizing apparatus 1.

An upper surface and a bottom surface of the magnetizing apparatus 1 may be composed of iron plates 9*a* and 9*b*, respectively, each of the iron plate 9*a* and 9*b* having a individual predetermined thickness, and the magnetic flux formed in the hollow body portion 3 may form a loop due to an effect of the iron plates 9*a*, 9*b*. The iron plates 9*a*, 9*b* are secured to a body of the magnetizing apparatus 1 with screws 16.

Figure 2:
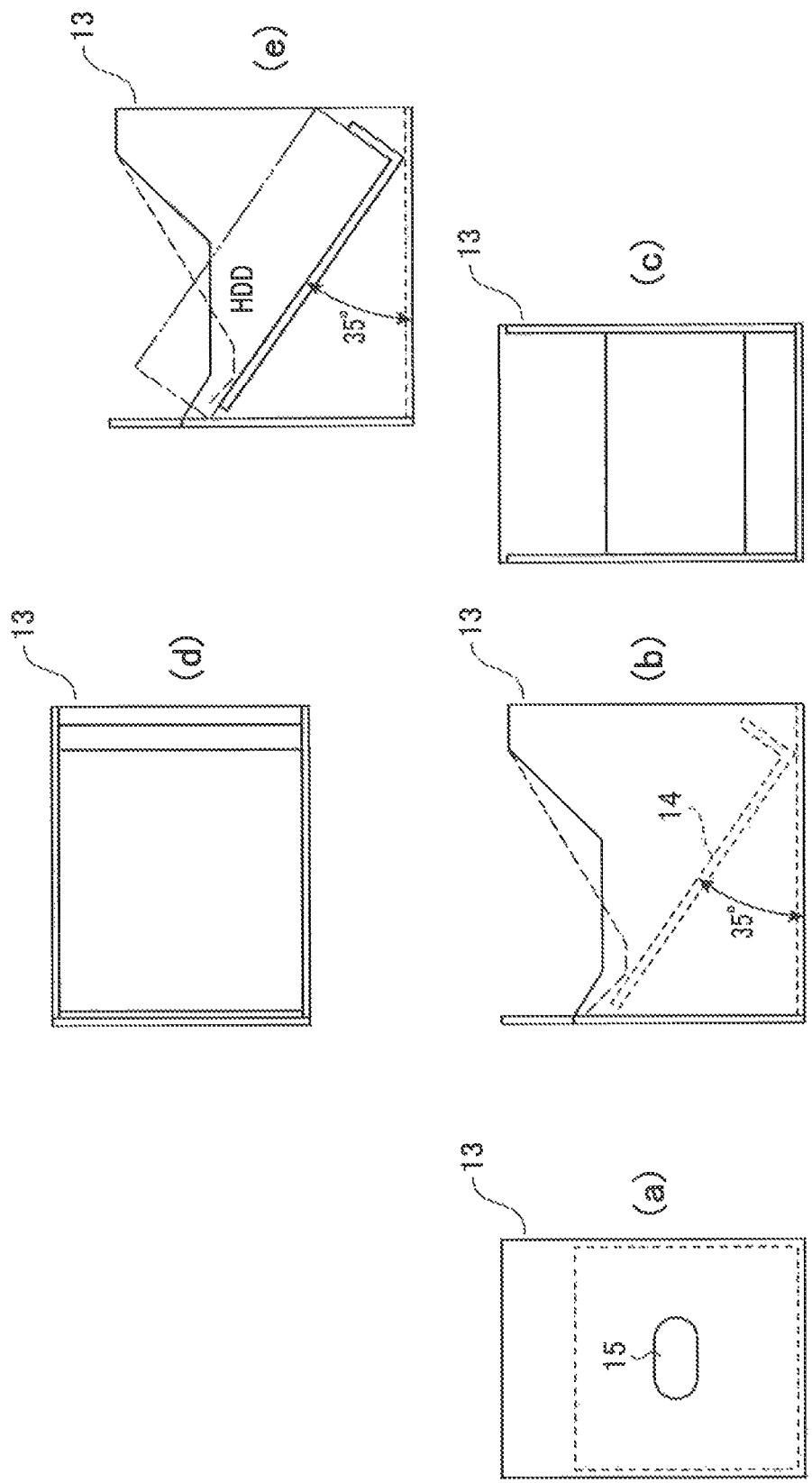

On the other hand, FIGS. 2*a*-2*e* are structure diagrams of the holding drawer 13 mounted in the magnetizing apparatus 1. FIG. 2*a* is a front view of the holding drawer 13, FIG. 2*b* is a side view of the holding drawer 13, FIG. 2*c* is a back view of the holding drawer 13, FIG. 2*d* is a top view of the holding drawer 13, and FIG. 2*e* is a diagram showing a state in which a hard disk drive is mounted on the holding drawer 13.

As shown in FIGS. 2*a*-2*e*, a mounting tray 14 is attached to the holding drawer 13, and a hard disk drive is placed on the mounting tray 14. The mounting tray 14 is inclined predetermined degrees of angle, for example 35 degrees, toward a bottom surface of the holding drawer 13, so the magnetizing apparatus 1 is configured that the hard disk drive (HDD) placed on the mounting tray 14 is inclined the predetermined degrees of angle, for example 35 degrees, toward the magnetic flux generated the hollow body portion 3.

Further, an opening 15 is formed at a front surface of the holding drawer 13 and serves as a handle, a grip, or a knob while mounting the holding drawer 13 into the magnetizing apparatus 1. It is noted that the holding drawer 13 and the mounting tray 14 may be made of a solid material, for example, plastic.

Although, in the above mentioned embodiment, the hard disk drive (HDD) is placed on the mounting tray 14 that is attached to the holding drawer 13, it is possible that the hard disk drive (HDD) is fixed such that the hard disk drive (HDD) is inclined the predetermined degrees of angle, for example 35 degrees, toward the magnetic flux generated in the hollow body portion 3.

When such the magnetizing apparatus 1 discussed above would be used to ease magnetic data stored in a hard disk drive, at first, the holding drawer 13 should be drawn from the magnetizing apparatus 1, and then the hard disk drive would be placed on the mounting tray 14 as shown in FIGS. 2*b* and 2*e*. As discussed above, FIG. 2*e* shows the state in which the hard disk drive has been placed on the mounting tray 14, wherein the mounting tray 14 has dimensions that should be determined in accordance with those of the hard disk drive which is magnetized in advance.

Next, the opening 15 may be used as the handle to mount the holding drawer 13, on which holding drawer 13 the hard disk drive is mounted, at a predetermined position within the magnetizing apparatus 1. This step for placement of the holding drawer 13 leads to a state in which a lower portion of the front surface of the holding drawer 13 drops in behind the stopper 6 to immobilize it within the magnetizing apparatus 1.

Next, in the state in which the holding drawer 13 on which the hard disk drive has been mounted is embedded within the magnetizing apparatus 1, electric current may be supplied to the magnetizing coil 2 from a (not shown) electric current supply circuit to magnetize the magnetizing coil 2, thereby forming magnetic flux in the hollow body portion 3 of the magnetizing apparatus 1. In the hollow body portion 3, magnetic field may be generated by the magnetizing coil, and the magnetic flux may be formed, for example in a direction from the rear side of the magnetizing apparatus 1 to the front side, and may be reflected from the upper iron plates 9*a* and the lower iron plate 9*b* so as to from loop of the magnetic flux. Therefore, the magnetic flux may inject to the upper or lower surface of the hard disk drive and passes through the hard disk drive at for example, a 35 degrees angle. It should be noted that value of the angle is not limited to this value, but any value between 10-70 degrees would be possible.

Because of this, the hard disk would be magnetized, and date stored in the hard disk drive (HDD) may be erased. And because the magnetic flux may be passed through the hard disk drive at 35 degrees angle, it is ensured that magnetic data stored in both of a hard disk drive (HDD) adopting perpendicular magnetic recording method and a hard disk drive (HDD) adopting an in-plane magnetic recording method (or horizontal magnetic recording method) can be erased using the same one step process for erasing the date stored in the hard disk drive efficiently.

Therefore, it is possible to erase data stored in the hard disk drive (HDD) easily, and it is also possible to reduce electric power for erasing the data. For example, the magnetic flux needed to perform such the data erasing process can be reduced to be about 7,000 Gauss when about 10000 Gauss is required for a field perpendicular to the media and 14000 Gauss if the field is parallel to the media.

Further, during process for magnetizing the hard disk drive as discussed above, the LED 12 may give off visual light upon receiving electric current supplied via the measurement winding 8, therefore, a user of the magnetizing apparatus 1 can know the data erasing process is in progress in a visual way.

Further, the magnetic flux generated by the magnetizing coil 2 can be measured using a signal passing through the measurement winding 8, and information the results of the measurement may be received by a (not shown) personal computer (PC) to use for controlling a drive current to be supplied to the magnetizing coil 2.

It should be noted that, although in the above description, the data erasing process the for erasing data stored in the hard disk drive (HDD) is discussed as one of examples of the present invention, a magnetic recording medium should not be limited to hard disk drives (HDD). Further, although in the above description, the mounting tray 14 on which the hard disk drive (HDD) is placed is inclined at 35 degrees angle toward the magnetic flux generated the hollow body portion 3, it is allowable that the mounting tray 14 is configured such that the mounting tray 14 and the magnetic flux generated the hollow body portion 3 forms an angle of a predetermined value (predetermined values) of degrees between 10 and 70 degrees, or other value(s) of degrees.

Further, although in the above discussion, the hollow body portion 3 may be configured to have dimensions having 110 mm in width, 133 mm in height, and 157 mm in depth, the dimensions of the hollow body portion 3 is not limited to have such the values, and further it is possible to modify the dimensions of the mounting tray 14 in accordance with the size and the shape of the magnetic recording medium that is to be placed on the mounting tray 14.

Further, in the embodiment discussed above, the hard disk drive (HDD) is magnetized to erase data stored in the hard disk drive (HDD) using the magnetizing apparatus 1 having the magnetizing coil 2, it is allowable that an AC degaussing apparatus that has a degaussing coil is used to perform a process for degaussing the hard disk drive
(HDD) to erase data stored in the hard disk drive (HDD).
(Second Embodiment)

A second embodiment of the present invention will be discussed below.

The second embodiment discloses an invention that provides other configuration of a holding drawer that is to be mounted within the magnetizing apparatus 1 than those disclosed in the first embodiment, and in explanation of the present embodiment, a hard disk drive fixing tray (fixture) (or a holding drawer means) (herein after it will be referred to as a "HDD fixing tray") will be used instead of the holding drawer that has been discussed previously to hold a hard disk drive.

Figure 3:
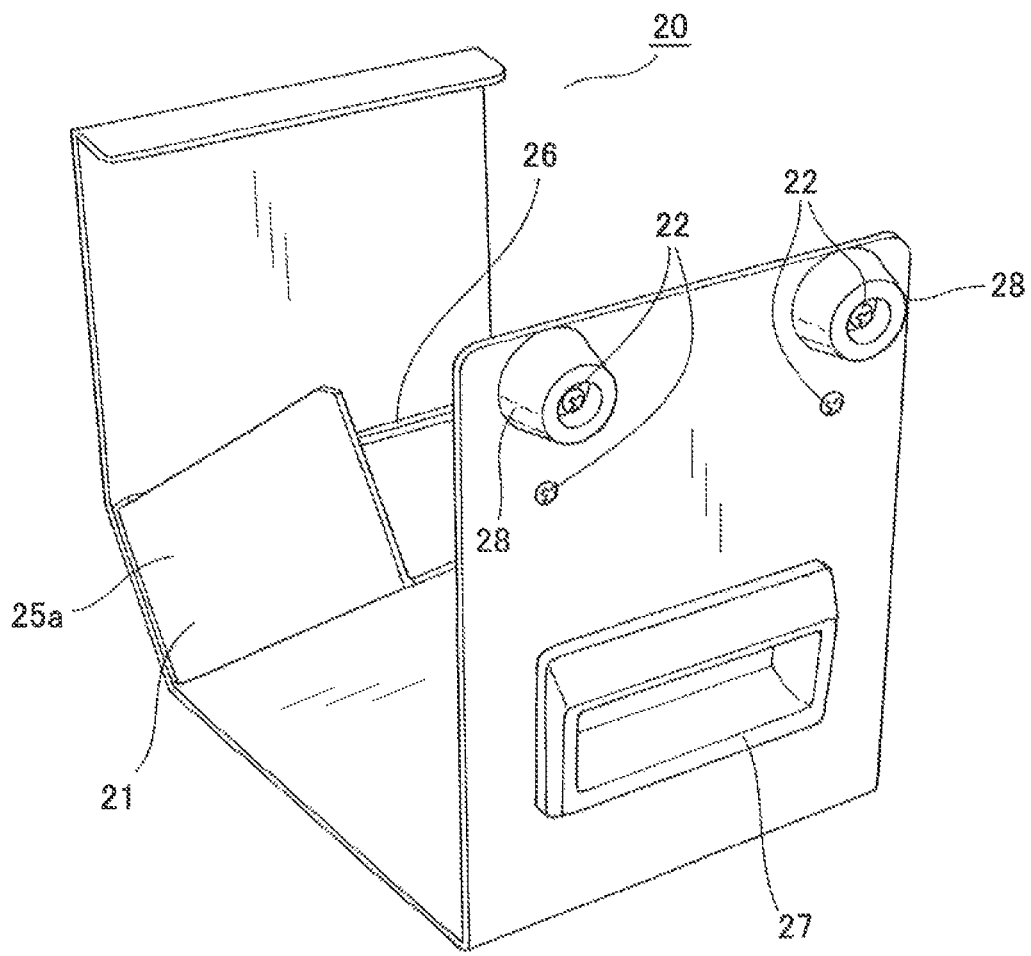
FIG. 3 is a perspective view of a magnetizing apparatus according to a second embodiment of the present invention viewed from a front side.
Figure 4:
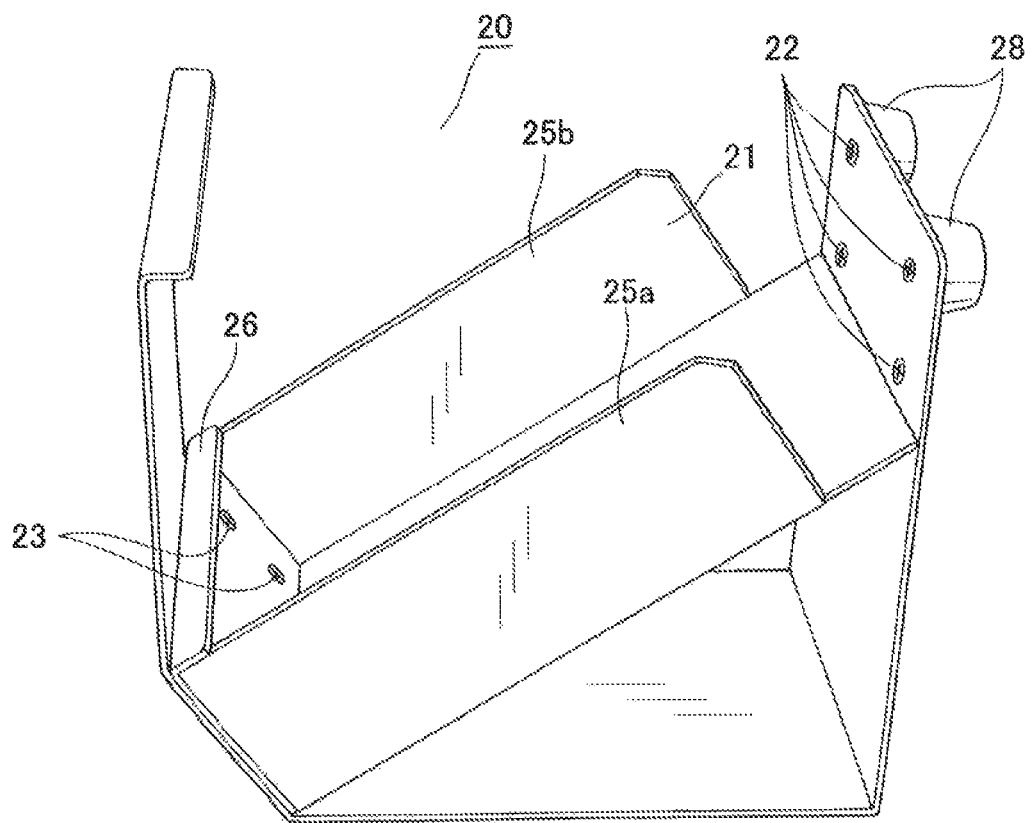
FIG. 4 is a perspective view of the magnetizing apparatus according to the second embodiment of the present invention viewed from a left side.

FIG. 3 is a perspective view of a HDD fixing tray according to the second embodiment of the present invention viewed from a front side. Further, FIG. 4 is a perspective view of the HDD fixing tray according to the second embodiment of the present invention viewed from a left side. In both of the figures, a mounting tray 21 is fixed to a HDD fixing tray 20, and a hard disk drive is placed on the mounting tray 21. The mounting tray 21 is inclined a predetermined value of degrees of angle, for example between 10 and 70 degrees, toward a bottom surface of the HDD fixing tray 20, so the magnetizing apparatus 1 is configured that the hard disk drive (HDD) placed on the mounting tray 21 is inclined the predetermined value of degrees of angle, for example between 10 and 70 degrees, toward the magnetic flux generated the hollow body portion 3.

The mounting tray 21 may be secured to the front surface of the HDD fixing tray 20 by four screws 22 or to the back surface 23 of the HDD fixing tray 20 by four screws 23 (although in FIG. 4, only two of the four screws 23 can be seen) so that the mounting tray 21 may be fixed to the HDD fixing tray 20. Guide plates 25a, 25b may be placed at sides of the mounting tray 21 in an upright position to prevent the hard disk drive from shifting in position in a transverse direction.

Further, the HDD fixing tray 20 according to the present embodiment may be provided with a pressure plate 26 (it may serves as holding means for holding a front-end portion of the magnetic recording medium of a predetermined length) to prevent the hard disk drive from going out of the mounting tray 21 due to a force which may be generated by magnetic field to be exerted on the hard disk drive (HDD) in the upward direction. The pressure plate 26 may be configured to have a length such that a front end portion of the upper surface of the hard disk drive (HDD) of about 10 cm is hidden under the pressure plate 26. Further, for example, the pressure plate 26 may be made of stainless steel and have 2 mm in thickness so that the pressure plate 26 has a sufficient rigidity capable resisting the force which is generated by magnetic field to be exerted on the hard disk drive (HDD) in the upward direction.

It should be noted that the pressure plate 26 is not limited to have 10 mm in length as in the example discussed above and is not limited to have 2 mm in thickness as in the example discussed above so that it is possible the pressure plate 26 may have a suitable thickness depending on a material of which the pressure plate 26 would be made.

Further, a handle 27 may be formed on a front surface of the magnetizing apparatus 1 to be used for ensuring greater ease in mounting of the mounting tray 21 into the magnetizing apparatus 1. In addition to the handle 27, there may be two elastic members 28 that may be attached to the front surface of the HDD fixing tray 20 and may have a function of cushion, and the elastic members 28 would contact with a (not shown) front plate of the magnetizing apparatus 1, when the HDD fixing tray 20 is subjected to a force generated by magnetic force.

To erase data stored in the hard disk drive (HDD) using a magnetic data eraser including the magnetizing apparatus 1 that may be configured as discussed above, at first, the HDD fixing tray 20 would be drawn from the magnetizing apparatus 1, and then the hard disk drive would be placed on the mounting tray 14 as shown in FIGS. 3 and 4.

Next, the handle 27 may be used to withdraw the HDD fixing tray 20 to place the HDD fixing tray 20 to a predetermined position within the magnetizing apparatus 1.

Next, in the state in which the HDD fixing tray 20 on which the hard disk drive is mounted may be positioned within the magnetizing apparatus 1, electric current may be supplied to the magnetizing coil 2 from a (not shown) electric current supply circuit to magnetize the magnetizing coil 2, thereby forming magnetic flux in the hollow body portion 3 of the magnetizing apparatus 1. The magnetic flux may be formed, for example in a direction from the rear side of the magnetizing apparatus 1 to the front side, and may be returned via the upper iron plates 9a, the lower iron plate 9b or air so as to from loop of the magnetic flux. Therefore, because the hard disk drive may be placed on the HDD fixing tray 20 that would be mounted within the hollow body portion 3, the magnetic flux enters to the upper or lower surface of the hard disk drive and passes through the hard disk drive.

Thus, the hard disk drive (HDD) may be magnetized, and data stored in the hard disk drive (HDD) would be erased. Further, the hard disk drive would be shifted in position in various directions because the hard disk drive (HDD) receives a force that is generated by magnetic force to which the hard disk drive (HDD) may be subjected. Although the shift of the hard disk drive due to the force in downward and transverse directions can be minimized by the bottom and side plates of the magnetizing apparatus 1, respectively, there may be no member to prevent the shift of the hard disk drive from occurring and thus there has been a problem associated with rising the hard disk drive (HDD).

However, the magnetizing apparatus 1 according to the present embodiment further may include the pressure plate 26 that would be configured to be placed on or above the hard disk drive (HDD) so as to be able to prevent the hard disk drive (HDD) from being levitated. Further, the pressure plate 26 may be configured to have a suitable length and a suitable thickness to ensure to prevent the hard disk drive (HDD) from being levitated.

Further, although in the first and second embodiment discussed above, the holding drawer 13 and the HDD fixing tray 20 which include the mounting tray for the magnetic recording medium would be mounted in the magnetizing apparatus 1 such that the mounting tray may be inclined a predetermined value of degrees of angle toward the magnetic flux generated the hollow body portion 3 to erase magnetic data stored in not only a hard disk drive (HDD) adopting an in-plane magnetic recording method (or horizontal magnetic recording method) but also a hard disk drive (HDD) adopting perpendicular magnetic recording method, it is allowable that the mounting tray may be placed in a horizontal position and the magnetizing apparatus 1 may be inclined a predetermined value of degrees of angle toward the horizontal plane so that magnetic flux may inject to the upper or lower surface of the hard disk drive and passes through the hard disk drive at certain degrees angle.

That is, the magnetizing apparatus 1 would be placed to be inclined a predetermined value of degrees of angle toward the horizontal plane and the holding drawer 13 or the HDD fixing tray 20 including the mounting tray on the magnetic recording medium would be placed are mounted in the magnetizing apparatus 1 in a horizontal position to erase magnetic data stored in not only a hard disk drive (HDD) adopting an in-plane magnetic recording method (or horizontal magnetic recording method) but also a hard disk drive (HDD) adopting perpendicular magnetic recording method. In this case, the hollow body portion 3 of the magnetizing apparatus 1 may be provided with a mounting guide that facilitate placement of the holding drawer 13 or the HDD fixing tray 20 in the hollow body portion 3 of the magnetizing apparatus 1 in a horizontal position, and the holding drawer 13 or the HDD fixing tray 20 may be moved along the mounting guide to be mounted in the magnetizing apparatus 1.

Further, in the present embodiment discussed above, the hard disk drive (HDD) may be magnetized to erase data stored in the hard disk drive (HDD) using the magnetizing apparatus 1 having the magnetizing coil 2, it is allowable that a degaussing apparatus that has a degaussing coil can be used to perform a process for degaussing the hard disk drive (HDD) to erase data stored in the hard disk drive (HDD).
(Third Embodiment)

Next, a third embodiment of the present invention will be explained.

In the present embodiment, a confirmation of completion of erasing data stored in hard disk drive (HDD), i.e., a magnetizing or a degaussing the hard disk drive, would be carried out by using an image sensor (capturing means for capturing an image of the magnetic recording medium) that is provided in the magnetic data eraser (or a magnetizing apparatus or a degaussing apparatus) for capturing an image of the hard disk drive (HDD).

Figure 5:
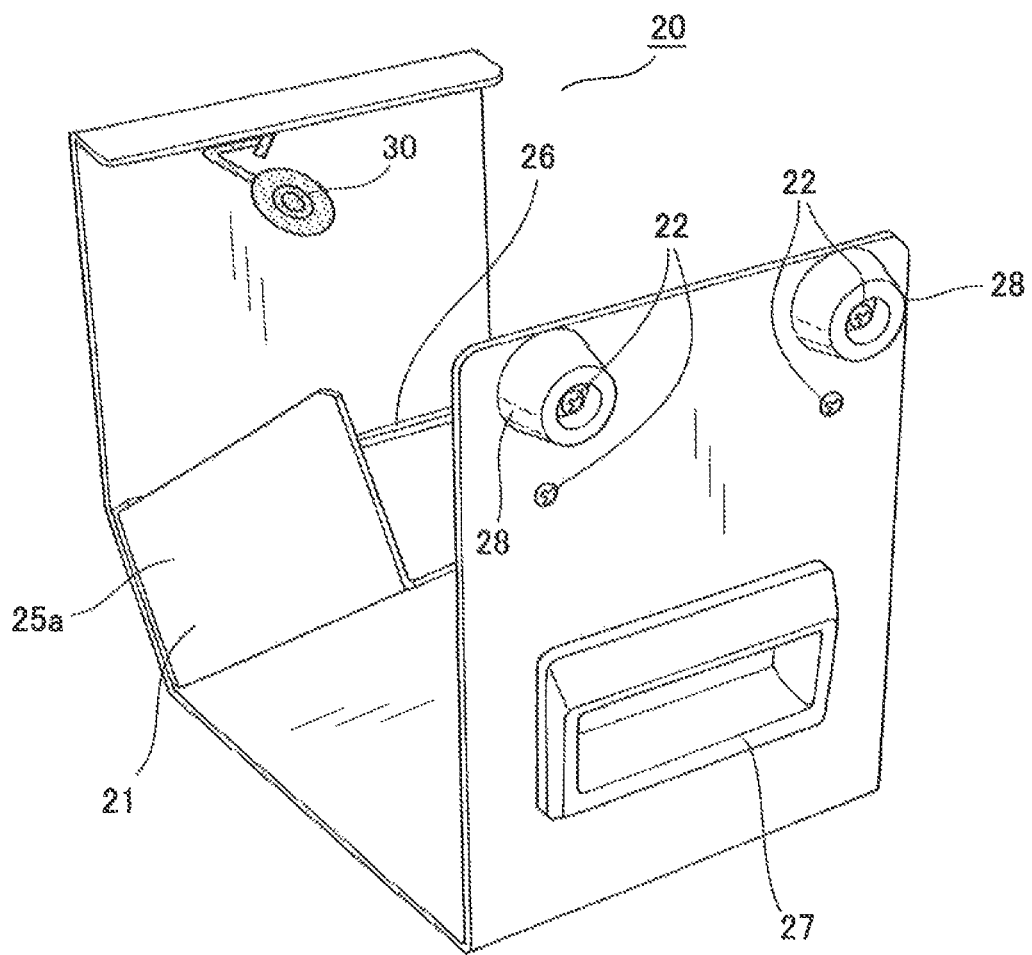
FIG. 5 is a perspective front view of a magnetizing apparatus according to a third embodiment of the present invention.

FIG. 5 shows a magnetizing apparatus to which the image sensor 30 mentioned above is installed. Specifically, the image sensor 30 is installed in the HDD fixing tray 20 to capture an image of the hard disk drive (HDD) from above and behind, wherein the hard disk drive (HDD) is secured to the HDD fixing tray 20. A Charge Coupled Device (CCD) sensor, a Complementary Metal Oxide Semiconductor (CMOS) sensor, and the like can be used as the image sensor 30, and a captured image captured by the image sensor 30 would send to a control device to be explained referring to FIG. 6. Further, it would be applicable that the image sensor 30 is not installed in the HDD fixing tray but provided at any position where the image sensor 30 can capture the image of the hard disk drive (HDD) from behind.

Figure 6:
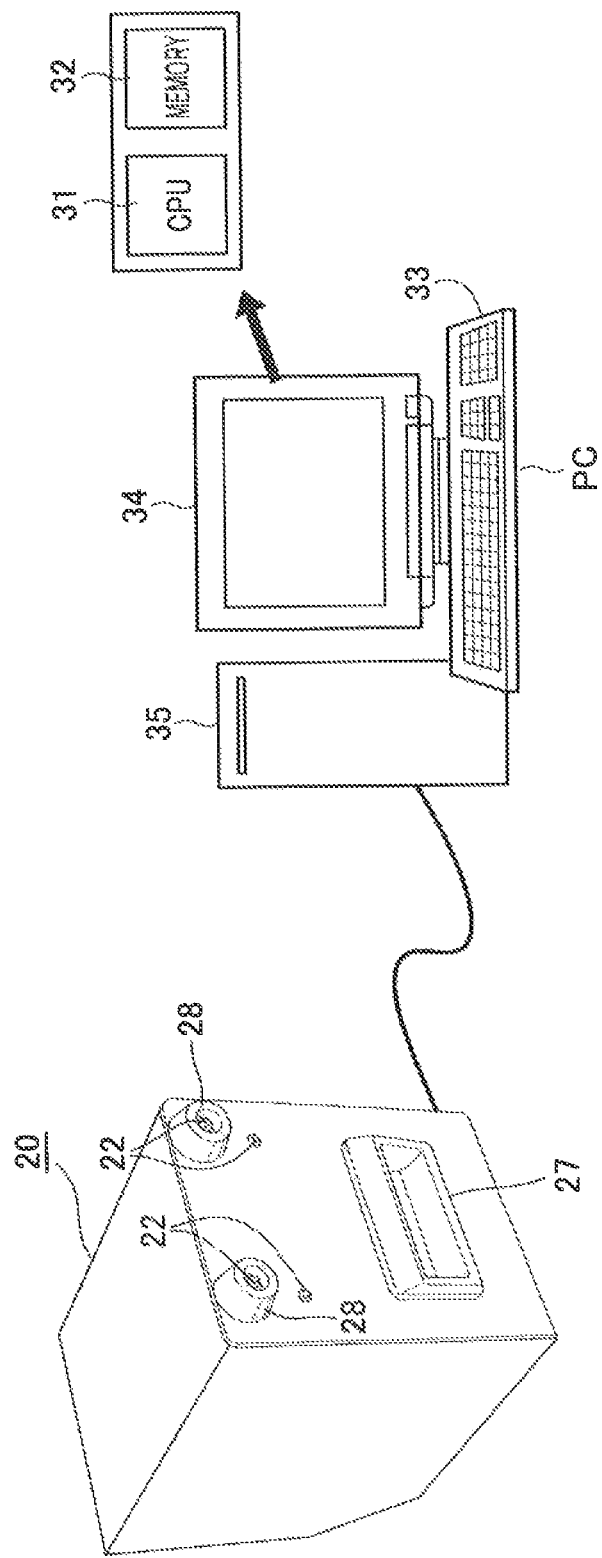
FIG. 6 is a diagram illustrating a configuration of a system according to the third embodiment of the present invention.

FIG. 6 shows a example of the control device to which the magnetizing apparatus 20 according to the present embodiment is connected, wherein the control device may be, for example, a personal computer (PC) that includes a central processing unit (CPU) 31, a memory 32, an input device 33, an output device 34, and a storage device 35, for example. Further, the memory 32 includes, for example, a Read Only Memory (ROM), a Random Access Memory (RAM), and the like, to store a program and data which would be used in processing. The program stored in the memory 32 may be utilized to perform activation and/or operation control of the magnetizing apparatus 10 mentioned above, activation and/or operation control of the imaging sensor 30, and the like. For example, an activation signal for activating the imaging sensor (hereinafter this area may also be referred to as an "imaging sensor activation signal") may be send to the magnetizing apparatus 1 to send an imaging signal for controlling imaging operation of the imaging sensor toward the imaging sensor 30 at a suitable timing.

Figure 7:
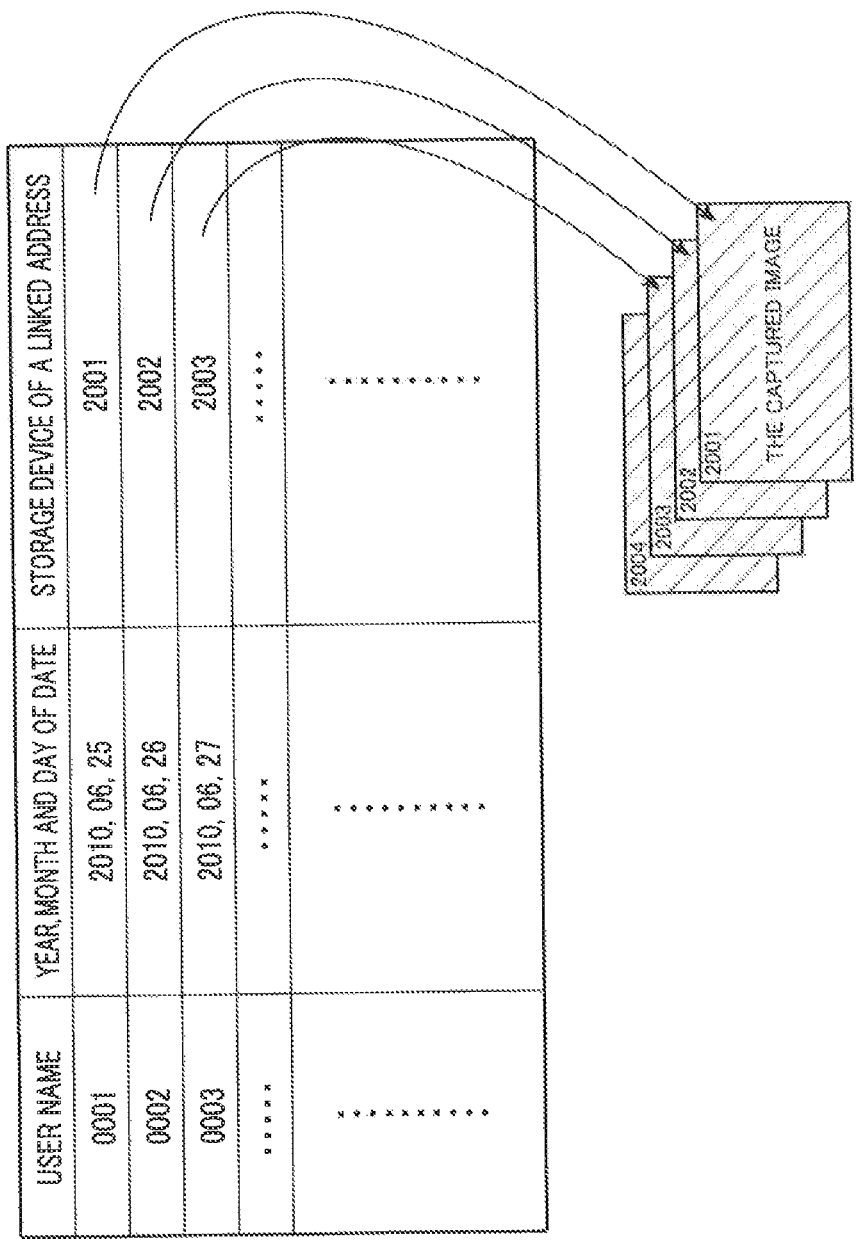
FIG. 7 is a diagram illustrating data structure which is used in the system according to the third embodiment of the present invention.

Further, data about the image of the hard disk drive (HDD) captured by the imaging sensor 30 would be stored in the storage device 35 (storage means for storing an image that is captured by the capturing means). For example, FIG. 7 is a diagram illustrating data structure which is used in the imaging sensor 30. As shown in FIG. 7, data stored in the imaging device 30 may have a storage area for user name of the corresponding hard disk drive (HDD) (hereinafter this area may also be referred to as a "user name area"), a storage area for date when data erasing operation for erasing data stored in the hard disk drive (HDD) has been performed (hereinafter this area may also be referred to as a "date area"), and a storage area for linked addresses (hereinafter this area may also be referred to as a "link address area"). Further, the storage area for linked addresses stores information about addresses of the memory at which the captured image of the corresponding hard disk drive (HDD).

In an example shown in FIG. 7, for example, characters of "user name (0001)" that indicates a user of the corresponding hard disk drive (HDD) is stored in the storage area for user name (i.e., the user name area), characters of "2010.06.25" which indicates year, month and day of date when data erasing operation for erasing data stored in the hard disk drive (HDD) has been performed is stored in the storage area for date (i.e., the date area), and characters of "2001" that indicates a linked address at which the captured image of the corresponding hard disk drive (HDD) is stored in the storage area for linked addresses (i.e., the link address area") as discussed above.

In a further example, characters of "user name (0002)" that indicates a user of the corresponding hard disk drive (HDD) is stored in the storage area for user name (i.e., the user name area), characters of "2010.06.26" which indicates year, month and day of date when data erasing operation for erasing data stored in the hard disk drive (HDD) has been performed is stored in the storage area for date (i.e., the date area), and characters of "2002" that indicates a linked address at which the captured image of the corresponding hard disk drive (HDD) is stored in the storage area for linked addresses (i.e., the link address area") as discussed above.

Here, operations in the system (configuration) discussed above will be explained.

At first, a hard disk drive (HDD) would be placed on the mounting tray 21 of the HDD fixing tray 20, and the HDD fixing tray 20 would be inserted into the magnetizing apparatus. Then, the activation signal for activating the magnetizing apparatus (hereinafter this area may also be referred to as a "magnetizing apparatus activation signal") would be sent from the personal computer (PC) to the magnetizing apparatus to supply electric current to the magnetizing coil 2 and to magnetize the hard disk drive (HDD) so that data stored in the hard disk drive (HDD) would be erased.

Next, the imaging sensor activation signal would be sent to the imaging sensor 30 to capture an image of the hard disk drive mounted on the HDD fixing tray 20 from above and/or behind. The captured image captured by the imaging sensor 30 would be sent to the storage device 35 of the personal computer (PC) via a lead so as to be stored in the storage device. Further, it would be applicable that the image sensor 30 is not installed in the HDD fixing tray but provided at any position where the image sensor 30 can capture the image of the hard disk drive (HDD) from behind.

For example, as shown in FIG. 7, characters of "user name (0003)" identifies a user of the corresponding hard disk drive (HDD), and characters of "2010.06.27" would be written in the date area, if date when data of this hard disk drive (HDD) has been erased is Jun. 27, 2010, as shown in FIG. 7. Further, information about address at which the captured image of the corresponding hard disk drive (HDD) is stored, for example, "0003", would be stored in the link address area.

Further, in the similar way, a log of erasing operations for erasing data stored in the hard disk drives (HDDs) may be kept together with the corresponding captured images of the hard disk drives (HDDs) sequentially. Such the configuration of the system can have evidence that data stored in the hard disk drive (HDD) has been erased, and can provide a certificate of completion of erasing data stored in hard disk drive (HDD) by sending the information about the captured image to the user or by mailing the captured image together with the hard disk drive (HDD). That is, because information that can specify the corresponding hard disk drive HDD), for example, the serial number of the hard disk drive (HDD) and the like, may be found in the captured image of the hard disk drive (HDD), it is possible to provide the certificate of completion of erasing data stored in hard disk drive (HDD) has been erased by mailing the captured image together with the hard disk drive (HDD).

Further, the magnetizing apparatus 1 includes a further light emitting means, for example a flash bulb, for irradiating light toward a target object whose image is to be captured by the capturing means. This further light emitting means uses electric current flowing through the measuring coil 2 to irradiate light toward the target object, and a timing means in which the electric current supplied to the further light emitting means functions as a trigger that causes the capturing means 30 to capture the image of the target object. For this purpose, the magnetizing apparatus 1 may have a sensor.

What is claimed is:

1. A magnetic data eraser, comprising:

holding drawer means for holding a magnetic recording medium and including a mounting tray for mounting the magnetic recording medium, the mounting tray being inclined a predetermined value of degrees of angle; and magnetizing means for magnetizing the magnetic recording medium, the magnetizing means being configured to be covered by a magnetizing coil and having a hollow body portion, wherein the holding drawer means is mounted in the hollow body portion, the magnetic recording medium is placed on the mounting tray of the holding drawer means, and the mounting tray is inclined toward a bottom surface of the holding drawer means.

\* \* \* \* \*